(12) United States Patent
Barber et al.

(10) Patent No.: US 8,448,080 B2
(45) Date of Patent: May 21, 2013

(54) TARGET SERVER IDENTIFICATION IN A VIRTUALIZED DATA CENTER

(75) Inventors: Keith Barber, Durham, NC (US); Adam J. Friedlander, Poughkeepsie, NY (US); Robert Hagan, Durham, NC (US); John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 12/650,849

(22) Filed: Dec. 31, 2009

(65) Prior Publication Data

US 2011/0161858 A1 Jun. 30, 2011

(51) Int. Cl.
*G06F 3/048* (2006.01)

(52) U.S. Cl.
USPC .............................................. 715/772; 726/7

(58) Field of Classification Search
USPC .............................................. 715/772; 726/7
See application file for complete search history.

(56) References Cited

U.S. PATENT DOCUMENTS

| | | | |
|---|---|---|---|
| 6,167,427 A * | 12/2000 | Rabinovich et al. | 709/201 |
| 8,214,882 B2 * | 7/2012 | Kegel et al. | 726/3 |
| 2005/0080810 A1 * | 4/2005 | Matsuura | 707/102 |
| 2006/0069761 A1 * | 3/2006 | Singh et al. | 709/222 |
| 2011/0161851 A1 * | 6/2011 | Barber et al. | 715/769 |
| 2011/0212783 A1 * | 9/2011 | Dale et al. | 463/42 |

\* cited by examiner

*Primary Examiner* — Sara England
(74) *Attorney, Agent, or Firm* — Steven Greenberg, Esq.; Carey, Rodriguez, Greenberg & O'Keefe

(57) ABSTRACT

A method for identifying target server computers for consolidating virtual machines in a virtualized data center includes measuring load constraints for different server computers in a virtualized data center. The method also include rendering in a load graph in a graphical user interface (GUI) for the target identification module different icons, each representative of a corresponding one of the different server computers, each icon in the load graph including a position in the load graph according to measured load constraints for a corresponding one of the different server computers. The method further includes selecting a server computer from amongst the different server computers. Finally, the method includes filtering the load graph in the GUI to exclude icons corresponding to server computers that are over-utilized, so that icons remaining visible in the load graph represent server computers that are suitable as a target server computer for server consolidation of virtual machines executing in the selected server computer.

20 Claims, 2 Drawing Sheets

TARGET SERVER IDENTIFICATION IN A VIRTUALIZED DATA CENTER

BACKGROUND OF THE INVENTION

1. Field of the Invention

The present invention relates to monitoring systems in general and more particularly to performance visualization in consolidating virtual machines in a virtualized data center.

2. Description of the Related Art

Monitoring systems detect and respond to operational problems, oftentimes before the end user becomes aware of those problems. Consequently, monitoring systems have become a common requirement, especially for revenue-generating production environments. Most administrators understand the need for monitoring systems. Infrastructure teams, in fact, typically monitor the basic health of application servers by keeping an eye on central processing unit (CPU) utilization, throughput, memory usage and the like. However, there are many parts to an application server environment, and understanding which metrics to monitor for each of these pieces differentiates the environments that can effectively anticipate production problems from those that might get overwhelmed by them.

When applied in an appropriate context, systems monitoring is more than just the data that shows how an enterprise system performs technically. Load balancing metrics such as CPU utilization, method response times and power consumption can be inspected to determine when one server has been overly taxed while another inefficiently underutilized. Load metrics analysis can be even more important given the advent of the virtualized data center.

The traditional data center includes a multiplicity of server computers coupled to one another communicatively over a computer communications network. Applications execute in the different server computers. Applications further can execute redundantly in the server computers in a load-balanced arrangement with a sprayer directing requests to different ones of the redundant server computers. Data center managers through systems monitoring monitor the load metrics on a given server computer to perform rebalancing of the different server computers. By comparison, in a virtualized data center, multiple virtual servers co-exist in a single server computer. Optionally, different server computers each can host one or more virtual servers. Through such an arrangement, tremendous reductions in total cost of ownership of a data center have been achieved. Other advantages include the ability to persist the state of an entire virtual server in disk storage for transportability in batch or real time to a different server computer. Consequently, server migration and server failover can be achieved with ease.

Monitoring systems for virtualized data centers have proven to be less effective than when applied to a traditional data center of different server computers. In this regard, while monitoring systems for traditional data centers measure the performance of a server computer in terms of load metrics experienced through the execution of one or more applications therein, in a virtualized environment a clear correlation between executing applications and the underlying load metrics cannot be established due to the intermediary virtual machines. Yet, monitoring systems can in fact monitor load metrics for a virtual machine. However, in the virtualized environment, a prospective rebalancing of virtual machines in different server computers cannot be readily visualized when considering a consolidation of different virtual machines in a single server computer.

BRIEF SUMMARY OF THE INVENTION

Embodiments of the present invention address deficiencies of the art in respect to monitoring systems for the virtualized environment and provide a novel and non-obvious method, system and computer program product for identifying target server computers for consolidating virtual machines in a virtualized data center. In an embodiment of the invention, a method for identifying target server computers for consolidating virtual machines in a virtualized data center is provided. The method includes measuring load constraints for different server computers in a virtualized data center. The method also include rendering in a load graph in a graphical user interface (GUI) for the target identification module different icons, each representative of a corresponding one of the different server computers, each icon in the load graph including a position in the load graph according to measured load constraints for a corresponding one of the different server computers.

The method further includes selecting a server computer from amongst the different server computers. Finally, the method includes filtering the load graph in the GUI to exclude icons corresponding to server computers that are over-utilized, so that icons remaining visible in the load graph represent server computers that are suitable as a target server computer for server consolidation of virtual machines executing in the selected server computer. In one aspect of the embodiment, filtering the load graph in the GUI to exclude icons corresponding to server computers that are over-utilized, further includes additionally filtering the load graph in the GUI to exclude icons corresponding to server computers that share similar load constraints as the selected server computer. In another aspect of the embodiment, filtering the load graph in the GUI to exclude icons corresponding to server computers that are over-utilized, further includes additionally filtering the load graph in the GUI to exclude icons corresponding to server computers that do not have a similar architecture as the selected server computer.

In another embodiment of the invention, a monitoring data processing system can be provided. The system can include a host computer with processor and memory and a monitoring system executing in the host computer and monitoring load metrics for a different server computers in a virtualized data center communicatively coupled to the host computer. The system further can include a target identification module coupled to the monitoring system. The module can include program code for displaying a load graph in a GUI of each of the server computers, for selecting a source server computer from amongst the server computers in the GUI, and for filtering a display of icons for the server computers to remove from view icons corresponding to server computers that are over-utilized, so that icons remaining visible in the load graph represent server computers that are suitable as a target server computer for server consolidation of virtual machines executing in the source server computer.

In one aspect of the embodiment, the program code of the target identification module is further enabled to additionally filter the load graph in the GUI to exclude icons corresponding to server computers that share similar load constraints as the selected server computer. In another aspect of the embodiment, the program code of the target identification module is further enabled to additionally filter the load graph in the GUI to exclude icons corresponding to server computers that do not have a similar architecture as the selected server computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for identifying target server computers for consolidating virtual machines in a virtualized data center. In accordance with an embodiment of the invention, different server computers in a virtualized data center can be identified and load metrics for each of the server computers can be collected. Thereafter, a graph can be displayed visualizing the performance of each of the server computers in a graphical user interface (GUI) of a monitoring system for the virtualized data center. A specific one of the server computers in the graph can be selected as a source server computer for consolidation with another of the server computers represented in the graph. In response to the selection of the source server computer, the other server computers represented in the graph can be filtered to remove from display in the graph any server computer already over-utilized. Further, the server computers can be filtered according to at least one of similar server architecture or disparate load constraints meaning that any load constraint experienced by the source server computer is not also experienced by any remaining server computers displayed in the graph. The remaining server computers visible in the graph can be considered viable target server computers for consolidation of the virtual machines resident in the source server computer.

Figure 1:
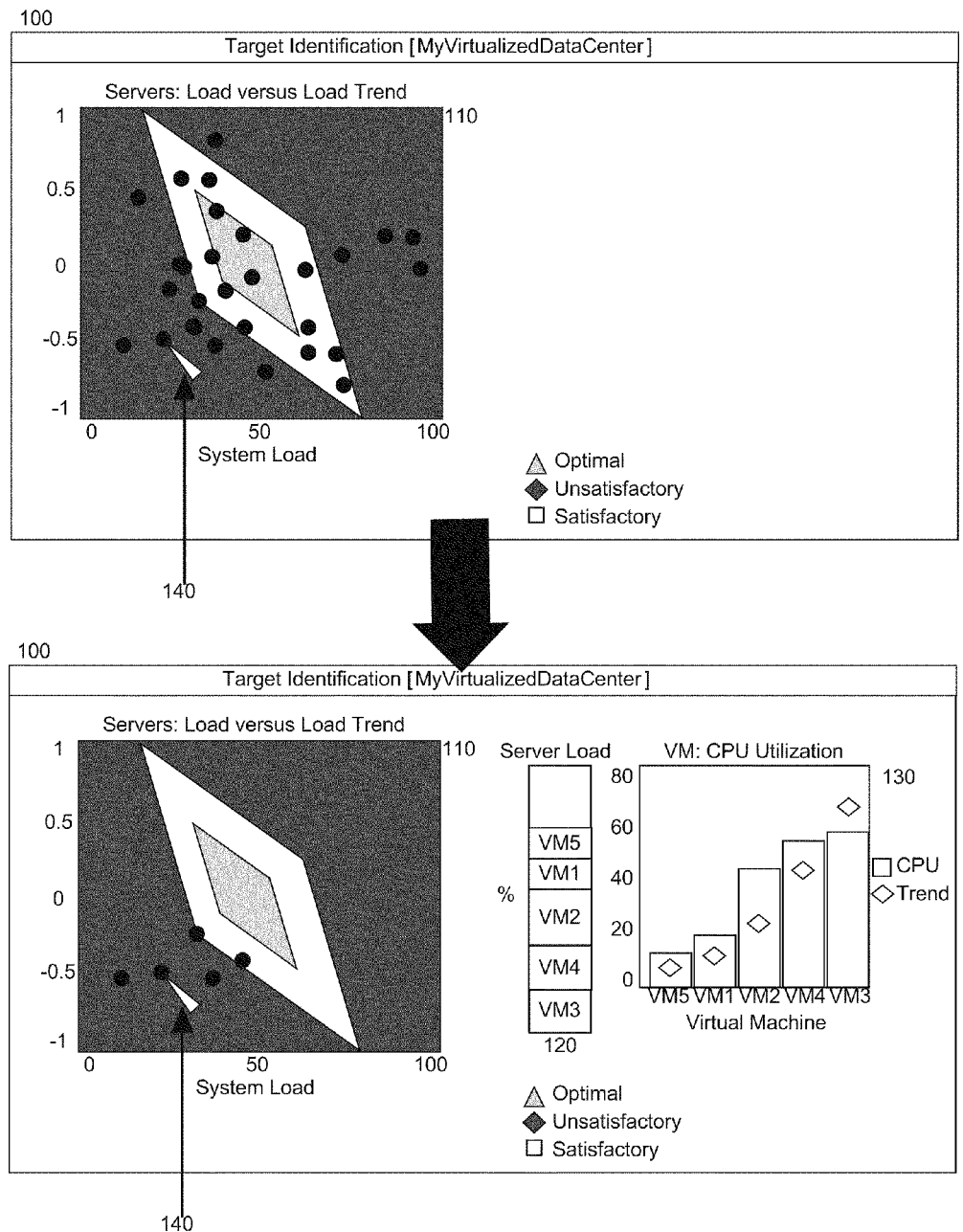
FIG. 1 is pictorial illustration of a graphical user interface (GUI) for identifying target server computers for consolidating virtual machines in a virtualized data center.

In further illustration, FIG. 1 is pictorial illustration of a GUI for identifying target server computers for consolidating virtual machines in a virtualized data center. As shown in FIG. 1, a target identification GUI 100 can be provided to display load metrics collected for different server computers in a virtualized data center. Specifically, the GUI 100 can include a load graph view 110 such as a scatterplot of the load experienced by each of the server computers relative to a load trend measured for each of the server computer over a specified period of time. As will be apparent from a review of the scatterplot shown in FIG. 1, some of the server computers will demonstrate overutilization when experiencing a higher than ordinary load and a trend that is either neutral or becoming even more loaded. (upper right-hand corner) By comparison, others of the server computers will demonstrate underutilization when experiencing a lighter than ordinary load and a trend that is either neutral or becoming even less loaded (bottom left-hand corner). Server computers experiencing ordinary load and little trending towards higher or lighter load are considered optimal.

In response to the selection by a pointing device 140 of an icon in the load graph view 110 representative of a server computer in the virtualized data center, a load gauge 120 and a central processor unit (CPU) utilization bar chart 130 can be displayed for the server computer represented by the selected icon. The load gauge 120 can indicate the total load experienced by the server computer and the contribution to the load of each virtual machine executing therein. The CPU utilization bar chart 130, in turn, can provide a bar chart of the CPU utilization in the server computer by each virtual machine executing therein.

Of note, the load graph view 110 in response to the selection of the icon representative of a selected server computer can be filtered to remove from view over-utilized server computers ill suited as a target for server computer consolidation. Further, server computers represented in the load graph view 110 can be removed from display when the server computers do not share a similar architecture (such as similar operating system, CPU, memory configuration, etc.) as the selected server computer and thus also are ill suited as a target for server computer consolidation for the selected server computer. Finally, server computers represented in the load graph view 110 that experience similar load constraints as that experienced by the selected server computer can be removed from view. For instance, excess CPU utilization, over-consumed memory, high network bandwidth utilization, or an over-used fixed disk. The resulting filtered server computers represented in the load graph view 110 reflect suitable target server computers for consolidating the virtual machines of the selected server computer.

Figure 2:
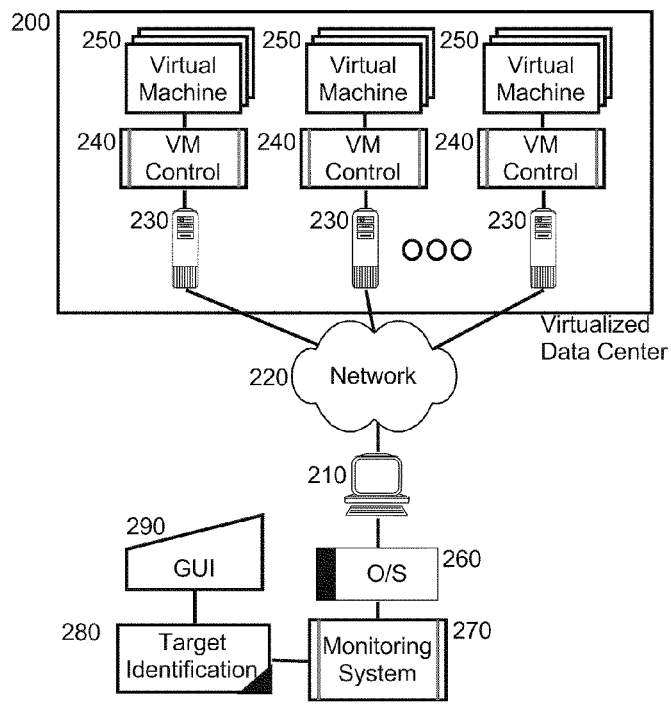
FIG. 2 is a schematic illustration of a monitoring data processing system configured for identifying target server computers for consolidating virtual machines in a virtualized data center; and, FIG. 3 is a flow chart illustrating a process for identifying target server computers for consolidating virtual machines in a virtualized data center.

The process described in connection with FIG. 1 can be implemented in a monitoring data processing system. In yet further illustration, FIG. 2 schematically shows a monitoring data processing system configured for identifying target server computers for consolidating virtual machines in a virtualized data center. The system can include a host computer 210 with at least one processor and memory. The host computer 210 can be configured for communicative coupling to a virtualized data center 200 over a computer communications network. The virtualized data center 200 can include one or more server computers 230, each with a virtual machine control application 240 controlling the co-existence of different virtual machines 250 accessing the resources of the server computers, including fixed storage, communications channels, memory and processor utilization.

The host computer 210 can include an operating system 260 executing by one or more of the processors in the memory of the host computer 210. A monitoring system 270, in turn, can be hosted by the operating system 260. The monitoring system 270 can include functionality sufficient to acquire load metrics for the different server computers 230 in the virtualized data center 200, including CPU utilization attributable to individual ones of the virtual machines 250 in respective ones of the server computers 230. Other metrics acquirable by the monitoring system 270 include power consumption by the different server computers 230, memory utilization, fixed disk utilization, network bandwidth utilization, and an overall load experienced by the different server computers 230.

Notably, a target identification module 280 can be coupled to the monitoring system 270 and can execute in the memory by one or more of the processors of the host computer 210. The module 280 can include program code enabled to display in a GUI 290 a graph view icons representative of the server computers 230 according to load and load trend. The module 280 further can include program code enabled to in response to a selection of one of the icons corresponding to a selected server computer, to display a load gauge or a load bar chart for the selected server computer. The module 280 yet further can include program code enabled to filter a display of the icons to only those icons representative of server computers that are both under-utilized and also either share a similar architecture as the selected server computer, or do not demonstrate similar load constraints as experienced by the selected server computer, or both.

Figure 3:
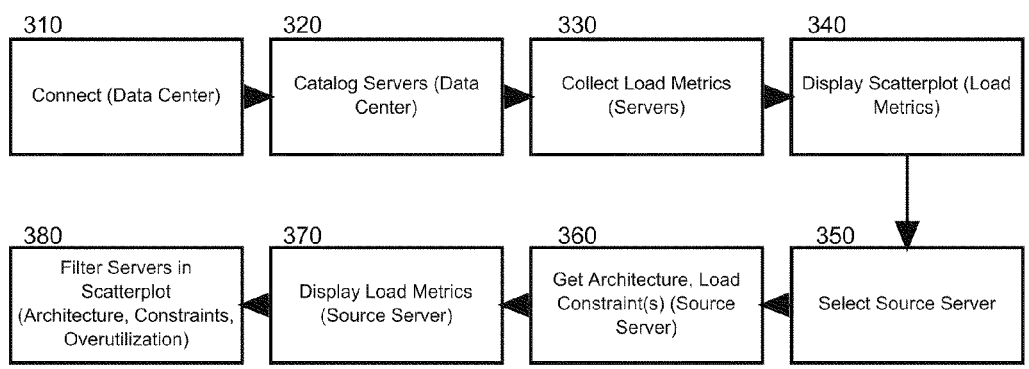

In even yet further illustration of the operation of the target identification module 280, FIG. 3 is a flow chart illustrating a process for identifying target server computers for consolidating virtual machines in a virtualized data center. Beginning in block 310, a communicative connection can be established with a virtualized data center. In block 320, a catalog of the different server computers in the virtualized data center can be determined and displayed in a GUI and in block 330, load metrics for each of the different server computers can be computed. In block 340, a scatterplot can be rendered showing server load compared to load trend for each of the server computers. A range of satisfactory performing server computers, unsatisfactory performing server computers and optimally performing server computers can be indicated by shading different regions of the scatterplot.

In block 350, both a source server computer can be selected from amongst those in the catalog, either through the scatterplot, or through a different user interface element in the GUI. In block 360, the physical architecture of the source server computer can be determined, including CPU and memory configuration, fixed disk configuration, operating system and the like. Additionally, in block 360, load constraints experienced by the source server computer can be determined such as excess CPU utilization, memory consumption, network bandwidth consumption and fixed disk usage to name only a few. Thereafter, in block 370 a display of the load constraints for the source server computer can be rendered in the GUI. Finally, in block 380, the scatterplot can be filtered to exclude icons representative of server computers that are over-utilized. The scatterplot further can be filtered to exclude icons representative of server computers either that do not share a similar or same architecture as the source server computer, that do share similar load constraints, or both. In this way, the icons remaining in view in the scatterplot will be representative of acceptable target server computers for server consolidation with the source server computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for identifying target server computers for consolidating virtual machines in a virtualized data center, the method comprising:

measuring load constraints for different server computers in a virtualized data center in a target identification module executing in memory by a processor of a host computer;

rendering in a load graph in a graphical user interface (GUI) for the target identification module a plurality of icons, each icon representative of a corresponding one of the different server computers, each icon in the load graph comprising a position in the load graph according to measured load constraints for a corresponding one of the different server computers;

selecting a server computer from amongst the different server computers; and, filtering the load graph in the GUI to exclude icons corresponding to server computers that are over-utilized, so that icons remaining visible in the load graph represent server computers that are suitable as a target server computer for server consolidation of virtual machines executing in the selected server computer.

2. The method of claim 1, wherein the load constraints comprise central processing unit (CPU) utilization, memory usage, disk usage and network bandwidth utilization.

3. The method of claim 1, wherein the load graph is a scatterplot.

4. The method of claim 1, wherein selecting a server computer from amongst the different server computers, comprises selecting an icon with a pointing device in the load graph.

5. The method of claim 1, wherein filtering the load graph in the GUI to exclude icons corresponding to server computers that are over-utilized, further comprises additionally filtering the load graph in the GUI to exclude icons corresponding to server computers that share similar load constraints as the selected server computer.

6. The method of claim 1, wherein filtering the load graph in the GUI to exclude icons corresponding to server computers that are over-utilized, further comprises additionally filtering the load graph in the GUI to exclude icons corresponding to server computers that do not have a similar architecture as the selected server computer.

7. The method of claim 1, further comprising displaying load metrics for the selected server computer in the GUI in response to the selection of the server computer.

8. A monitoring data processing system comprising:

a host computer with processor and memory;

a monitoring system executing in the host computer and monitoring load metrics for a plurality of server computers in a virtualized data center communicatively coupled to the host computer; and, a target identification module coupled to the monitoring system, the module comprising program code for displaying a load graph in a graphical user interface (GUI) of each of the server computers, for selecting a source server computer from amongst the server computers in the GUI, and for filtering a display of icons for the server computers to remove from view icons corresponding to server computers that are over-utilized, so that icons remaining visible in the load graph represent server computers that are suitable as a target server computer for server consolidation of virtual machines executing in the source server computer.

9. The system of claim 8, wherein the program code of the target identification module is further enabled to additionally filter the load graph in the GUI to exclude icons corresponding to server computers that share similar load constraints as the selected server computer.

10. The system of claim 8, wherein the program code of the target identification module is further enabled to additionally filter the load graph in the GUI to exclude icons corresponding to server computers that do not have a similar architecture as the selected server computer.

11. The system of claim 8, wherein the load constraints comprises central processing unit (CPU) utilization, memory usage, disk usage and network bandwidth utilization.

12. The system of claim 8, wherein the load graph is a scatterplot.

13. The system of claim 12, wherein the scatterplot accounts for both load and load trend for each of the server computers in the virtualized data center.

14. A computer program product comprising a computer usable storage medium embodying computer usable program code for identifying target server computers for consolidating virtual machines in a virtualized data center, the computer program product comprising:

computer usable program code for measuring load constraints for different server computers in a virtualized data center in a target identification module executing in memory by a processor of a host computer;

computer usable program code for rendering in a load graph in a graphical user interface (GUI) for the target identification module a plurality of icons, each icon representative of a corresponding one of the different server computers, each icon in the load graph comprising a position in the load graph according to measured load constraints for a corresponding one of the different server computers;

computer usable program code for selecting a server computer from amongst the different server computers; and, computer usable program code for filtering the load graph in the GUI to exclude icons corresponding to server computers that are over-utilized, so that icons remaining visible in the load graph represent server computers that are suitable as a target server computer for server consolidation of virtual machines executing in the selected server computer.

15. The computer program product of claim 14, wherein the load constraints comprise central processing unit (CPU) utilization, memory usage, disk usage and network bandwidth utilization.

16. The computer program product of claim 14, wherein the load graph is a scatterplot.

17. The computer program product of claim 14, wherein the computer usable program code for selecting a server computer from amongst the different server computers, comprises computer usable program code for selecting an icon with a pointing device in the load graph.

18. The computer program product of claim 14, wherein the computer usable program code for filtering the load graph in the GUI to exclude icons corresponding to server computers that are over-utilized, further comprises computer usable program code for additionally filtering the load graph in the GUI to exclude icons corresponding to server computers that share similar load constraints as the selected server computer.

19. The computer program product of claim 14, wherein the computer usable program code for filtering the load graph in the GUI to exclude icons corresponding to server computers that are over-utilized, further comprises computer usable program code for additionally filtering the load graph in the GUI to exclude icons corresponding to server computers that do not have a similar architecture as the selected server computer.

20. The computer program product of claim 14, further comprising computer usable program code for displaying load metrics for the selected server computer in the GUI in response to the selection of the server computer.

\* \* \* \* \*